(12) United States Patent  
Collins

(10) Patent No.: US 10,311,657 B2  
(45) Date of Patent: Jun. 4, 2019

(54) SYSTEM AND METHOD FOR IDENTIFYING MACHINE WORK CYCLE PHASES

(71) Applicant: Caterpillar Inc., Peoria, IL (US)

(72) Inventor: Darryl V. Collins, Jindalee (AU)

(73) Assignee: Caterpillar Inc., Deerfield, IL (US)

( * ) Notice: Subject to any disclaimer, the term of this patent is extended or adjusted under 35 U.S.C. 154(b) by 244 days.

(21) Appl. No.: 15/381,775

(22) Filed: Dec. 16, 2016

(65) Prior Publication Data

US 2018/0174377 A1   Jun. 21, 2018

(51) Int. Cl.
| | |
|---|---|
| *G07C 5/08* | (2006.01) |
| *E02F 9/20* | (2006.01) |
| *E02F 9/26* | (2006.01) |
| *E02F 3/84* | (2006.01) |
| *G05D 1/02* | (2006.01) |
| *G05D 1/12* | (2006.01) |

(52) U.S. Cl.
CPC .............. *G07C 5/08* (2013.01); *E02F 9/2054* (2013.01); *E02F 9/261* (2013.01); *E02F 9/264* (2013.01); *E02F 3/842* (2013.01); *G05D 1/0278* (2013.01); *G05D 1/12* (2013.01)

(58) Field of Classification Search
CPC ......... G05D 1/0278; G05D 2201/0202; G05D 1/12; E02F 9/26; E02F 3/842; G07C 5/02
See application file for complete search history.

(56) References Cited

U.S. PATENT DOCUMENTS

| | | | |
|---|---|---|---|
| 8,364,440 B2 | 1/2013 | Putkonen | |
| 8,386,110 B2* | 2/2013 | Maekawa | G05D 1/0217 |
| | | | 180/168 |
| 9,037,338 B2* | 5/2015 | Osagawa | E02F 9/205 |
| | | | 340/968 |
| 9,052,209 B2 | 6/2015 | Jericho et al. | |
| 9,383,754 B2* | 7/2016 | Takeda | G05D 1/0278 |
| 2007/0096896 A1 | 5/2007 | Zingelewicz et al. | |
| 2010/0076640 A1* | 3/2010 | Maekawa | G05D 1/0217 |
| | | | 701/26 |
| 2010/0198466 A1* | 8/2010 | Eklund | E02F 9/26 |
| | | | 701/50 |
| 2013/0184927 A1 | 7/2013 | Daniel et al. | |
| 2013/0325208 A1* | 12/2013 | Osagawa | E02F 9/205 |
| | | | 701/2 |

(Continued)

FOREIGN PATENT DOCUMENTS

WO   WO 2016/118122   7/2016

*Primary Examiner* — Jason Holloway
(74) *Attorney, Agent, or Firm* — Finnegan, Henderson, Farabow, Garrett & Dunner, LLP

(57) ABSTRACT

A system is disclosed for monitoring work cycles on a worksite including a truck and a loading machine. The system includes a communications interface, memory storing instructions, and a processing unit configured to execute the instructions. The processing unit receives, via the communications interface, location information and acceleration information for the truck and location information for the loading machine. The processing unit determines a distance between the truck and the loading machine based on the location information. The processing unit determines a phase of a work cycle of the truck based on the determined distance between the truck and the loading machine and on the acceleration information for the truck.

20 Claims, 4 Drawing Sheets

(56) References Cited

U.S. PATENT DOCUMENTS

| | | | |
|---|---|---|---|
| 2015/0134184 A1* | 5/2015 | Takeda | G05D 1/0278 |
| | | | 701/24 |
| 2015/0178859 A1 | 6/2015 | Takeda | |
| 2016/0035152 A1 | 2/2016 | Kargupta | |
| 2016/0223387 A1* | 8/2016 | Talmaki | G01G 19/083 |
| 2017/0169626 A1* | 6/2017 | Thomsen | G07C 5/008 |
| 2018/0087240 A1* | 3/2018 | Schmitt | E02F 3/437 |
| 2018/0106709 A1* | 4/2018 | Cherney | G07C 5/008 |

* cited by examiner

SYSTEM AND METHOD FOR IDENTIFYING MACHINE WORK CYCLE PHASES

TECHNICAL FIELD

This disclosure relates generally to earth working machines and the sites on which they work. More particularly, this disclosure is directed to systems and methods for identifying the work cycle phases of such machines based on accelerometer data.

BACKGROUND

A common operation on many worksites is the excavation and removal of material. For example, in open-cut mines, material is excavated from a certain location and loaded into trucks for transport to a designated dumping location. Loading machines, such as electric mining shovels or excavators, are commonly used to load the trucks with material. Loading machines collect material in a bucket and deliver it to the bed of the truck, which will usually have the capacity for multiple bucket-loads of material.

Monitoring the work cycles of the truck and/or the loading machine can be useful. For example, a worksite operator may want to monitor the number of work cycles completed in a workday to assess productivity, the amount of revenue generated, the amount of inventory moved, or other parameters.

Some operators, such as operators of large worksites, can afford high-end trucks and loading machines equipped with sensors that support systems for monitoring work cycles. For example, some high-end trucks have a payload sensor that measures the weight of the payload in the truck bed, a bed sensor that senses whether the bed is raised or lowered, a gear sensor that senses the gear in which the truck is operating, and/or a ground speed sensor that measures the ground speed of the truck. High-end loading machines may have similar sensors, as well as a bucket sensor configured to sense the height or angle of the bucket. Using the information provided by these sophisticated sensors, work cycles or phases thereof can be determined.

One example of such a system is disclosed in U.S. Pat. No. 8,364,440 to Putkonen ("the '440 patent"). In the system described in the '440 patent, a loading machine is equipped with sensors that monitor the signals of the control stick, including speed, direction, and tool state. The loading machine also has a sensor that measures the weight of the payload in the bucket. The '440 patent system applies a mathematical model to the information provided by these sensors to determine the work cycle and state of the loading machine.

While the system of the '440 patent may assist worksite operators in assessing productivity, it may have certain drawbacks. For example, the equipment needed to implement the monitoring of the '440 patent may be too expensive for operators of smaller worksites, such as coal mines and quarries. And even operators of larger worksites may want to avoid purchasing expensive equipment for monitoring work cycles. Accordingly, a less expensive solution is needed.

This disclosure is directed to overcoming one or more of the problems set forth above and other problems in the art.

SUMMARY OF THE DISCLOSURE

One aspect of the disclosure relates to system for monitoring work cycles on a worksite that includes a truck and a loading machine. The system may include a communications interface, memory storing instructions, and a processing unit. The processing unit may be configured to execute the instructions to receive, via the communications interface, location information and acceleration information for the truck and location information for the loading machine. The processing unit may determine a distance between the truck and the loading machine based on the location information. The processing unit may determine a phase of a work cycle of the truck based on the determined distance between the truck and the loading machine and on the acceleration information for the truck.

Another aspect of the disclosure relates to a method for monitoring work cycles on a worksite that includes a truck and a loading machine. The method may include receiving location information and acceleration information for the truck and location information for the loading machine. The method may include determining, using a processing unit, a distance between the truck and the loading machine based on the location information. The method may include determining, using the processing unit, a phase of a work cycle of the truck based on the determined distance between the truck and the loading machine and on the acceleration information for the truck.

Yet another aspect of the disclosure is directed to a system for monitoring work cycles on a worksite that includes a truck and a loading machine. The system may include a communications interface, memory storing instruction, and a processing unit. The processing unit may be configured to execute the instructions to receive, via the communications interface, location information and acceleration information for the loading machine and location information for the truck. The processing unit may determine a distance between the loading machine and the truck based on the location information. The processing unit may determine a phase of a work cycle of the loading machine based on the determined distance between the loading machine and the truck and on the acceleration information for the loading machine.

DETAILED DESCRIPTION

Figure 1:
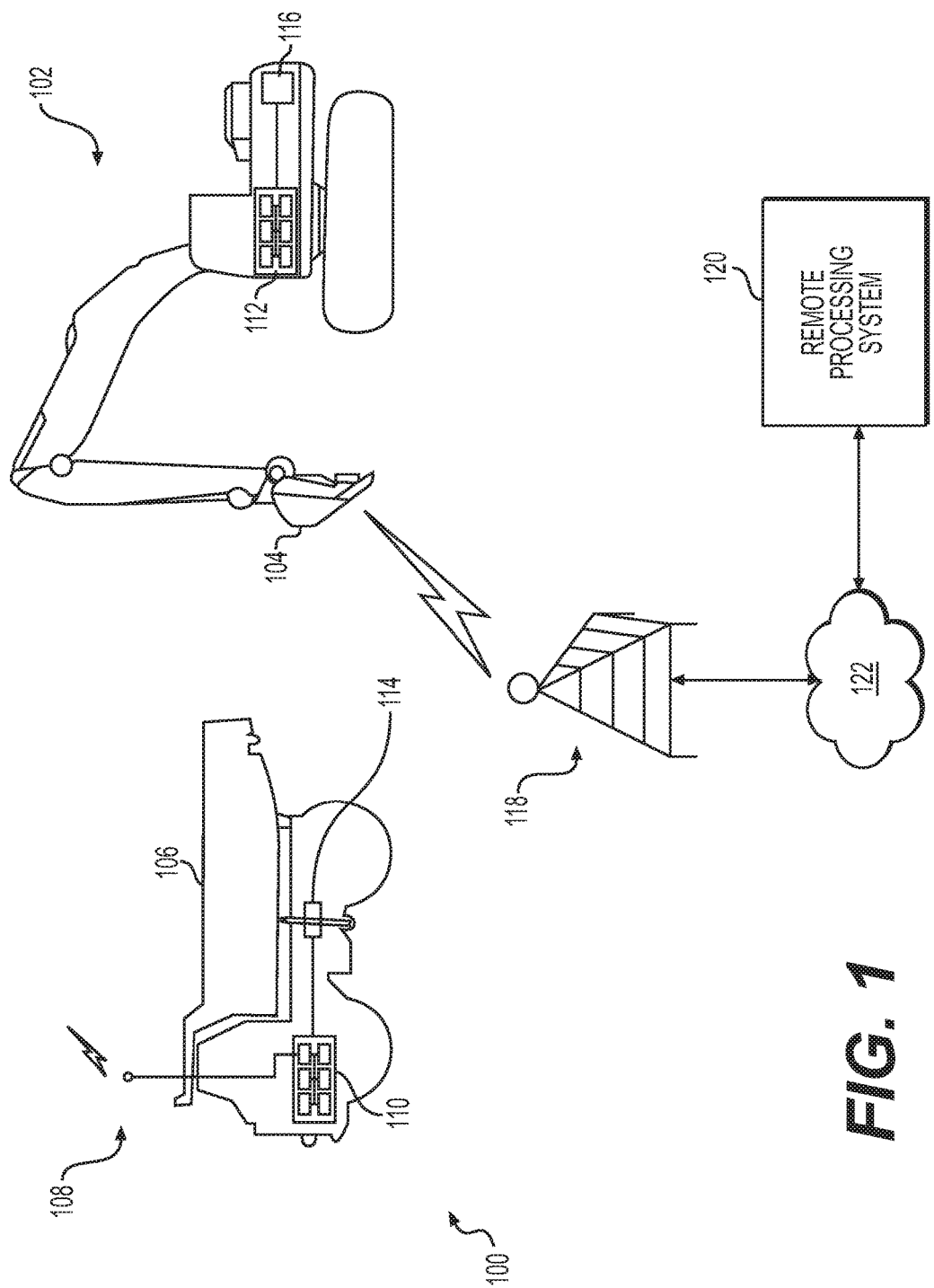
FIG. 1 shows an exemplary worksite on which a truck and a loading machine may operate.

FIG. 1 illustrates a worksite 100 in which volumes of material may be moved between locations, such as a loading location and a dumping location. The worksite 100 may be a mine, a quarry, a scrap yard, or any other place where material is collected and moved between locations. At the worksite 100, a loading machine 102—such as an excavator, electric shovel, or loader—may be operated to collect material—such as ore, rocks, and the like—in a bucket 104 and dump the material onto a bed 106 of a truck 108. The worksite 100 may have any number or combination of trucks 108 and loading machines 102 (generally "machines").

Figure 2:
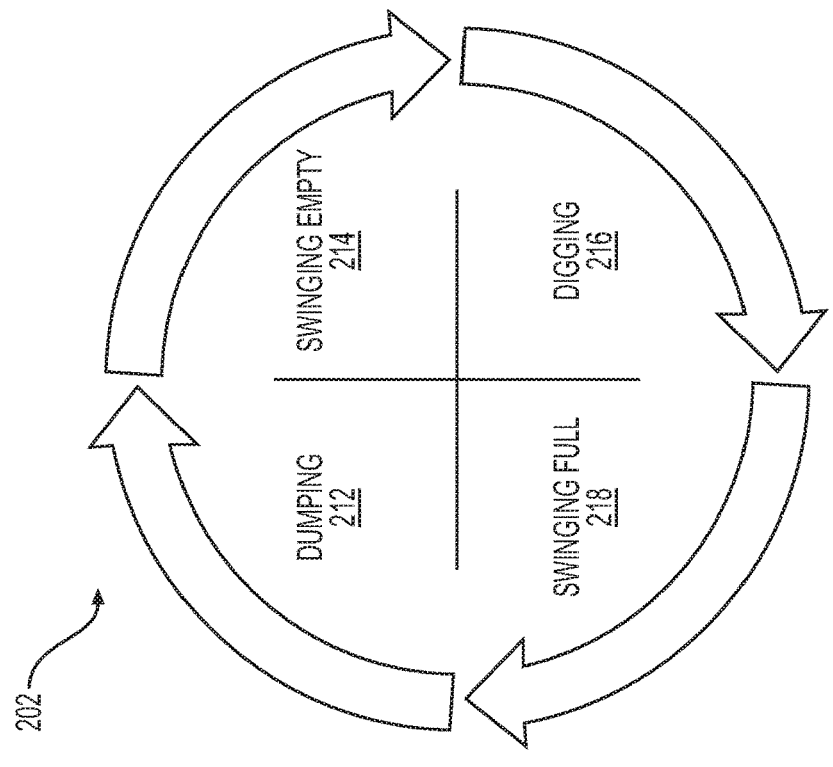
FIG. 2 illustrates exemplary work cycles of the truck and the loading machine on the worksite.
Figure 2:
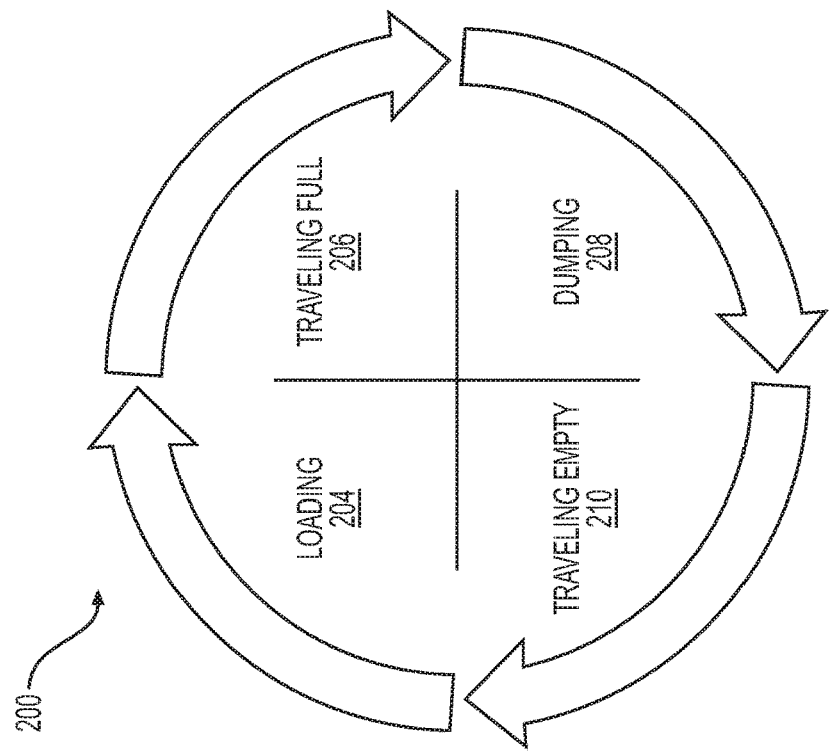

FIG. 2 shows an exemplary truck work cycle 200 of the truck 108 and a corresponding exemplary work cycle 202 of the loading machine 102. The work cycle 200 of the truck 108 may include a loading phase 204, a traveling full phase 206, a dumping phase 208, and a traveling empty phase 210. The corresponding work cycle 202 of the loading machine 102 may include a dumping phase 212, a swinging empty phase 214, a digging phase 216, and a swinging full phase 218.

In the loading phase 204, the truck 108 may be positioned at or near the loading location on the worksite 100, waiting to be loaded with material by the loading machine 102. During that time, the loading machine 102 may be in the dumping phase 212, where the loading machine 102 empties loads of material from its bucket 104 into the bed 106 of the truck 108 until the bed 106 is full.

After completing the loading phase 204, the truck 108 may enter the traveling full phase 206. In the traveling full phase 206, the truck 108 may travel from the loading location to the dumping location on the worksite 100. While the truck 108 is traveling full, the loading machine 102 may enter the swinging empty phase 214, where the operator of the loading machine 102 may operate the loading machine 102 to swing the empty bucket 104 back to the digging location to dig and remove more material.

The truck 108 may then enter the dumping phase 208, in which the operator of the truck 108 may position the truck 108 at the dumping location on the worksite 100 and operate the bed 106 to empty its payload of material. After the dumping phase 208, the truck 108 may enter the traveling empty phase 210, where it returns to the loading location, empty, obtain another load.

During the traveling full phase 206, the dumping phase 208, and/or the traveling empty phase 210 of the truck 108, the loading machine 102 may begin the digging phase 216. In the digging phase 216, the operator may control the loading machine 102 to fill the bucket 104 with another load material from the digging location. Both cycles 200, 202 may then repeat in this manner until the job is finished, the day ends, or some other event occurs.

While the work cycles 200, 202 are described above as having four phases, further granularity of phases is contemplated. For example, a queuing phase may be distinguished from the loading phase 204 of the truck 108. In the queuing phase, for example, the truck 108 may be waiting for other trucks to complete their loading phases 204. The loading machine 102 also have a similar phase in which it is waiting for a truck 108 to arrive at the loading location.

Returning to FIG. 1, the truck 108 and/or the loading machine 102 may be equipped with respective processing systems 110, 112. The processing systems 110, 112 may include any combination of computing components known it the art. These components may include hardware computer processors configured to execute computer-readable instructions; electronic control modules; volatile memory, nonvolatile memory, data storage devices (i.e., computer-readable media); communications interfaces and/or devices; and/or user input/output devices.

The processing systems 110, 112 may be configured to receive and process data from respective sensors 114, 116 on the truck 108 and the loading machine 102, respectively. In one embodiment, the processing systems 110, 112 may be connected respectively to the sensors 114, 116 by a datalink, such as a controller area network (CAN) bus, a Modbus, a J1939 link, a Wi-Fi link, or a Bluetooth link.

In one embodiment, the sensors 114, 116 may include an accelerometer. The accelerometer may be a device known in the art that is configured to measure acceleration of the truck 108 or the loading machine 102 in the x-, y-, and/or z-axes, and to output a signal indicative of the measured acceleration. For purposes of this description, in terms of the orientation of the truck 108 or the loading machine 102, the x-axis may be the forward/backward direction, the y-axis may be the left/right direction, and the z-axis may be the vertical direction.

In another embodiment, the sensors 114, 116 may include a gyroscope. The gyroscope may be a device known in the art that is configured to measure the rotation of truck 108 or loading machine 102 around the x-, y-, and/or z-axes—roll, pitch, and/or yaw—and to output a signal indicative of the measured rotation.

In another embodiment, the sensors 114, 116 may include a magnetometer. The magnetometer may be a device known in the art that is configured to measure a magnitude of the magnetic field around the truck 108 or the loading machine 102 in the x-, y-, and/or z-axes, and to output a signal indicative of a measured magnetic field. The signals output by the sensors 114, 116 may be received by the respective processing system 110, 112 in messages transmitted over the datalink.

The sensors 114, 116 may include any combination of the accelerometer, the gyroscope, and the magnetometer. In one embodiment, the sensors 114, 116 may include only the accelerometer. In another embodiment, the sensors 114, 116 may include all three instruments. For example, the sensors 114, 116 may comprise a known inertial measurement unit (IMU) package containing all three sensors. In another embodiment, the sensors 114, 116 may include the accelerometer and either the gyroscope or the magnetometer.

The sensors 114, 116 may also include a global positioning system (GPS) device. The GPS device may be a device known in the art that is configured to determine the location of the truck 108 or the loading machine 102 in an external coordinate system, such as latitude and longitude. The GPS device may also be configured to output a signal indicative of the determined location. The signal may be received at the respective processing system 110, 112 as a message transmitted over the datalink.

The sensors 114, 116 may include other types of sensors as well. For example, the sensors 114, 116 may include a payload sensor that provides a weight or mass of a load in the bucket 104 or the bed 106, a ground speed sensor that provides ground speed of the truck 108 or the loading machine 102, a gear sensor that identifies the gear being used, and/or a body position sensor that provides a body position of the truck 108 or the loading machine 102.

The processing systems 110, 112 may also be configured to wirelessly communicate, via a radio 118, with a remote processing system 120. For example, the processing systems 110, 112 may transmit messages containing information about the acceleration, rotation, magnetic field, and/or location of the truck 108 and the loading machine 102. The messages may be transmitted via the radio 118 to the remote processing system 120. The messages may be transmitted continuously or may be collected by the processing systems 110, 112 and transmitted in batches.

The radio 118 may be any type of wireless radio system or device known in the art. For example, radio 118 include a Wi-Fi radio, a cellular radio (e.g., 3G, 4G, LTE, or LTE Advanced), or a Bluetooth radio. In one embodiment, the radio 118 may communicate the messages it receives from the processing systems 110, 112 of the truck 108 and the loading machine 102 to the remote processing system 120 through a communications network 122. The communications network 122 may include the Internet, an Ethernet, a local area network (LAN), a wide area network (WAN), or any other type of electronic communications network known in the art.

Figure 3:
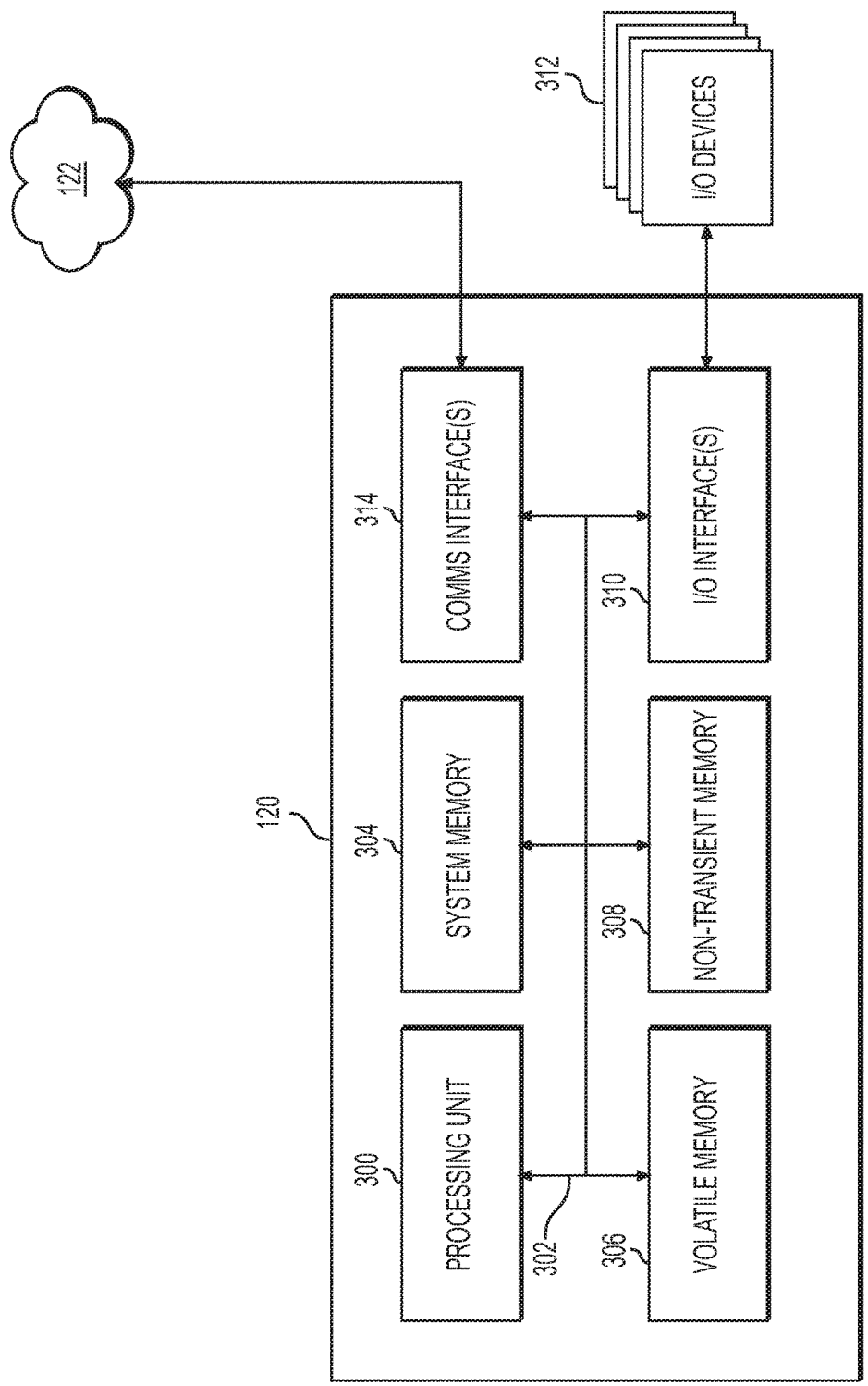
FIG. 3 shows an exemplary remote processing system that communicates with the truck and the loading machine.

FIG. 3 illustrates an embodiment of the remote processing system 120. The remote processing system 120 may be located at the worksite 100 or elsewhere. In one embodiment, the remote processing system 120 may include one or more dedicated servers or a cloud server system on the communications network 122. The remote processing system 120 may be provided as a service to assist an entity managing the worksite 100.

As shown in FIG. 3, the remote processing system 120 may include a combination of computing components known in the art for communicating, processing, and outputting data. For example, the processing system 120 may include a processing unit 300. The processing unit 300 may include a single hardware computational processing device (e.g., a microprocessor) or a number of such processing devices. Through a communications bus 302, the processing unit 300 may be in data communication with computer-readable media. The computer-readable media may include system memory 304 (e.g., a read-only memory storing a BIOS for basic system operations), volatile memory 306 (e.g., random-access memory such as one or more DRAM modules), and/or non-transient memory 308 (e.g., one or more hard disk drives, solid state drives, flash memory devices, or similar data storage devices). Instructions and data to control operation of the processing unit 300 may be stored on the system, volatile, and/or non-transitory memory 304, 306, and 308. The processing unit 300 may be configured to execute the instructions and process the data to perform the disclosed functions. For example, the remote processing system 120 may store and run one or more applications providing the disclosed functions of the remote processing system 120.

The remote processing system 120 may have one or more input/output interfaces 310 that allow the remote processing system 120 to interface with input/output devices 312. As will be appreciated, a wide variety of input/output devices 312 may be used, such as keyboards, pointing devices, touch-screens, touch-screen displays, displays, microphones, speakers, computer-readable media (e.g., hard drives, solid state drives, or flash memory devices), or other devices for receiving user input or providing user output. The remote processing system 120 may also include one or more communications interface(s) 314, such as a Network Interface Cards and/or modems, allowing for wired or wireless connection to the communications network 122.

The remote processing system 120 may be configured to receive, via the communications network 122, messages containing information measured by the sensors 114, 116 of the truck 108 and the loading machine 102. These messages may be transmitted by the processing systems 110, 112 of the truck 108 and the loading machine 102 and received at the remote processing system 120 during a specified period, such as part of a work day, an entire work day, a work week, or another period over which analysis is desired. For example, the remote processing system 120 may continuously or periodically receive one or more streams or batches of such messages from the processing systems 110, 112 of the truck and the loading machine 102.

In one embodiment, the messages may include acceleration messages that contain information about the acceleration of the truck 108 or the loading machine 102; rotation messages containing information about the rotation of the truck 108 or the loading machine 102; and/or magnetic field information messages containing information about the magnetic field around the truck 108 or the loading machine 102. Additionally, the remote processing system 120 may receive location information messages containing information about the location of the truck 108 and the loading machine 102, such as the latitude and longitude determined by the GPS device on the machines.

In one embodiment, an acceleration information message may contain values for the magnitude of the measured acceleration of the machine on any of the x-, y-, and/or z-axes. Alternatively, the acceleration information message may contain a value for the magnitude of the acceleration and a value for the direction of the acceleration of the machine. Still further, the acceleration information message may have a value for the scalar magnitude of the acceleration without any direction. The acceleration message may further contain an identifier identifying the particular truck 108 or the loading machine 102 to which the message belongs. Alternatively or additionally, the identifier may identify the particular sensor 114, 116 that measured the acceleration of the truck 108 or the loading machine 102. The acceleration information message may also contain a time stamp indicating a time at which the acceleration value for the truck 108 or the loading machine 102 was measured. Thus, in one embodiment, an acceleration information message may have the following general structure:

| Acceleration Information Message | | |
|---|---|---|
| Time Stamp | Identifier(s) | Acceleration Value(s) |
| — | — | — |

The rotation information message, the magnetic field information message, and the location information message may have the same general structure as the acceleration information message. But instead of having values for acceleration, these messages may have values for the rotation of the machine, the magnetic field around the machine, and the location of the machine, respectively. The message structure describe above is exemplary only and other formats may be used instead. Additionally, although the acceleration, rotation, magnetic field, and location information messages are described as separate messages, they may be combined into a single message containing the individual messages as sub-messages or fields of information within the larger message. The messages may be combined onboard the truck 108 or the loading machine 102 by the respective processing systems 110, 112 before transmission to the remote processing system 120, or may be combined at the remote processing system 120 after being received individually from the processing systems 110, 112 of the machines. The remote processing system 120 may store the messages in memory 304-308 for further processing.

The remote processing system 120 may be configured to analyze and process the received acceleration information messages, rotation information messages, magnetic field information messages, and location information messages (or the combined messages). In particular, the remote processing system 120 may create truck cycle data records and loading machine cycle records. Each truck cycle data record may contain values for the acceleration of the truck 108, the rotation of the truck 108, and/or the magnetic field around the truck 108 measured within the same sample period (e.g., 10-100 milliseconds). Similarly, each loading machine cycle data record may contain values for the acceleration of the loading machine 102, the rotation of the loading machine 102, and/or the magnetic field around the loading machine 102 measured within the same sample period.

In one embodiment, the truck cycle data records may have the following structure:

| Truck Cycle Data Records | | | | |
|---|---|---|---|---|
| Time | Distance Between Truck and Loading Machine | Acceleration of Truck | Rotation of Truck | Magnetic Field Around Truck |
| — | — | — | — | — |
| — | — | — | — | — |

Each truck cycle data record may contain values measured by one or more sensors 114 of the truck 108 within the same sample period (e.g., 10 milliseconds). In particular, as shown in the table above, a truck cycle data record may contain a time field. The time field may indicate the time at which the values in the record were measured by the sensors 114 on the truck 108. All values in the same row (i.e., record) may correspond to measurements taken at the same time (i.e., within the same sampling period).

Each truck cycle data record may also contain a distance between the truck 108 and the loading machine 102 at the time indicated in the time field for that data record. The remote processing system 120 may be configured to determine this distance using location information messages for the truck 108 and the loading machine 102 that have time stamps corresponding to the time contained in the time field of the truck cycle data record. Thus, the distance field for each record may indicate the distance between the truck 108 and the loading machine 102 at a particular time.

The truck cycle data record may also have one or more values for the acceleration of the truck 108. The acceleration values may correspond to the acceleration measured on the truck 108 at the time contained in the time field of the truck cycle data record. The remote processing system 120 may identify the acceleration values to use for each truck cycle data record from the time stamp of the acceleration information messages of the truck 108. Thus, the acceleration value(s) in each data record may have been sampled within the same period as the distance listed in the distance field for that record. In one embodiment, to reduce the computing resources needed to process the truck cycle data records, only acceleration in the z-direction (vertical) may be used in the truck cycle data records. In other embodiments, however, any combination of values of acceleration in the x-, y-, and z-direction may be used.

As shown in the table above, the truck cycle data record may also contain fields for the rotation of the truck 108 and the magnetic field around the truck 108. These fields may be similar to the acceleration field, but may contain rotation values and magnetic fields values measured by the sensors 114 at the time indicated in the time field of the data records. That is, the rotation and magnetic field values in a record may have been sampled within the same sampling period as the acceleration values in that record.

Accordingly, each truck cycle data record may represent a "snapshot" of the truck 108's behavior and distance from the loading machine 102 on the worksite 100 at a particular moment in time. And a set of truck cycle data records may indicate the truck 108's behavior and distance from the loading machine 102 on the worksite 100 over a period of time (e.g., a work day).

The fields in the truck cycle data records discussed above are exemplary. Any combination of the fields discussed above may be used. For example, in one embodiment, a truck cycle data record may reflect only the distance between the truck 108 and the loading machine 102 and the acceleration of the truck 108. In a further embodiment, the record may only contain a value for the acceleration of the truck 108 on the z-axis, or in the vertical direction. Such embodiments may require less computing resources to perform the disclosed processes while still enabling accuracy in identifying the cycle phases of the truck 108. In still other embodiments, a truck cycle data record may include values for different types of measurements, depending on the sensors 114 available on the truck 108. For example, if the truck 108 has a payload sensor, the truck cycle data record may alternatively or additionally contain a value indicating the weight or mass of the payload in the bed 106 at that point in time.

The loading machine cycle data records may be similar or even identical to the truck cycle data record. However, a loading machine cycle data record may contain values for acceleration, rotation, magnetic field, and/or other measurements discussed above (e.g., payload) for the loading machine 102 instead of for the truck 108. For example, in one embodiment, the loading machine cycle data records may have the following structure and information.

| Loading Machine Cycle Data Records | | | | |
|---|---|---|---|---|
| Time | Distance Between Loading Machine and Truck | Acceleration of Loading Machine | Rotation of Loading Machine | Magnetic Field Around Loading Machine |
| — | — | — | — | — |
| — | — | — | — | — |

The remote processing system 120 may be configured to train a truck cycle learning model using the truck cycle data records as input. The remote processing system may be further configured to train a loading machine cycle learning model using the loading machine cycle data records as input. As is known in the art, a learning model, when executed by a computer, may process an input data set, identify patterns in the data set, and provide an output indicating the identified patterns. One example of such a learning model is a Hidden Markov Model (HMM). However, any desired type of learning model may be used by the remote processing system 120 to train the truck cycle learning model. Other examples of learning models that can be used include a Bayesian network and a neural network.

In one embodiment, the remote processing system 120 may be configured to train the truck cycle learning model to identify truck cycle data records that correspond to the loading phase 204, the traveling full phase 206, the dumping phase 208, and the traveling empty phase 210. The remote processing system 120 may use the distance between the truck 108 and the loading machine 102 and the corresponding acceleration values contained in the truck cycle data records to train the learning model. In one configuration, only the z-axis acceleration value (vertical) may be used. In other embodiments, any combination of the acceleration value(s), the rotation values, and the magnetic field values may be used, in addition to the distance, to train the truck cycle learning model.

There may be certain patterns in the acceleration values for the truck 108 depending up on the distance from the loading machine 102. Those patterns may correspond to particular cycle phases of the truck 108. For example, in the loading phase 204, the truck 108 may be within a certain distance of the loading machine 102. The distance from the truck 108 to the loading machine 102 may not change much, or at all, during the loading phase 204. Additionally, since the truck 108 is being loaded with material by the loading machine 102, the truck 108 may bounce. This may cause z-direction (vertical) acceleration, and possibly x-direction and y-direction accelerations as well. As the bed 106 of the truck 108 is loaded with more material and the combined mass of the truck 108 and the material increases, the truck 108 may bounce at a lower rate and a higher amplitude. Thus, the truck cycle learning model may determine truck cycle data records to correspond to the loading phase 204 based on the values for distance from the truck 108 to the loading machine 102 and for acceleration, contained in the data records.

When the truck 108 moves to the traveling full phase 206, the distance from the loading machine 102 increases. Additionally, the truck 108 may bounce as it travels across the worksite 100 to the dumping location. However, the truck 108 may bounce differently than it bounces during the loading phase 204, when it is stationary and being loaded with material. Different accelerations may also occur in the x-direction and the y-direction, as the truck 108 maneuvers through the worksite 100. Thus, the truck cycle learning model may determine that certain truck cycle data records correspond to the traveling full phase 206 based on the values for distance from the truck 108 to the loading machine 102 and for acceleration contained in the data records. The truck cycle data records can also be determined to correspond to the traveling full phase 206 based on a determination that preceding data records correspond to the loading phase 204.

When the truck 108 enters the dumping phase 208, the truck 108 may experience acceleration that is different from the previous two phases as the bed 106 tilts and empties material onto the dumping location. Additionally, the distance between the truck 108 and the loading machine 102 may remain relatively constant and above a certain threshold distance because the truck 108 stops at the dumping site. Thus, the truck cycle learning model may determine that certain truck cycle data records correspond to the to the dumping phase 208 based on the values for distance from the truck 108 to the loading machine 102 and for acceleration contained in the data records. Truck cycle data records can also be determined to correspond to the dumping phase 208 based on a determination that preceding data records correspond to the traveling full phase 206.

When the truck 108 enters the traveling empty phase 110, the truck 108 may experience z-direction acceleration that is different from the acceleration when the truck 108 is traveling full. For example, because the mass of the empty truck 108 is less than the combined mass of the truck 108 and the material in the bed 106, the truck 108 may bounce at a higher rate and a lower amplitude in the traveling empty phase 210 than in the traveling full phase 206. Additionally, the distance between the truck 108 and the loading machine 102 may decrease during this phase as the truck 108 travels across the worksite 100 to the loading location. Thus, the truck cycle learning model may determine that certain truck cycle data records correspond to the traveling empty phase 210 based on the values for distance from the truck 108 to the loading machine 102 and for acceleration contained in the data records. Truck cycle data records can also be determined to correspond to the traveling empty phase 210 based on a determination that preceding data records correspond to the dumping phase 208.

Other values in the truck cycle data records may alternatively or additionally be used by the model to determine and/or corroborate the particular phase of the truck cycle 200. For example, in the loading phase 204, the loading machine 102 may swing its bucket 104 toward the truck 108 and then away from the truck 108 after dropping the load of material. The movement of the large metal bucket 104 and linkages of the loading machine 102 may cause a fluctuation in the magnetic field around the truck 108. Similarly, in the dumping phase 208, the magnetic field around the truck 108 may change as the metal bed 106 tilts to dump the load of material. But unlike the loading phase 204 where the magnetic field around the truck 108 may fluctuate several times as the bucket 104 moves toward and away from the truck 108 to fill the bed 108, there may be only a single fluctuation in the magnetic field in the dumping phase 208 as the bed 108 tilts once and returns to its starting position after dumping the load of material. Thus, the truck cycle data records can be determined to correspond to the dumping phase, 208, for example, based on the values for distance from the truck 108 to the loading machine 102 and for magnetic field around the truck 108 contained in the data records.

In one embodiment, the remote processing system 120 may be configured to train the truck cycle learning model to recognize the loading phase 204, the traveling full phase 206, the dumping phase 208, and/or the traveling empty phase 210 of the truck work cycle 200. The remote processing system 120 may train the truck cycle learning model using the values for distance between the truck 108 and the loading machine 102, and the corresponding acceleration of the truck 108, contained in the truck cycle data records. In one embodiment, the remote processing system 120 may use only z-axis acceleration values to train the truck cycle learning model. In other embodiments, the remote processing system 120 may use combinations of x-, y-, and z-axis acceleration values to train the truck cycle learning model. The remote processing system 120 may alternatively or additionally use other values contained in the truck cycle data records, such as the rotation values and/or the magnetic field values. Remote processing system 120 may train the loading machine cycle learning model in the same way as the truck cycle learning model, but using the loading machine cycle data records instead of the truck cycle data records.

Once the truck cycle learning model is trained, and/or during training, the remote processing system 120 may be configured to provide the truck cycle data records as input to the truck cycle learning model to generate an output of the particular phase 204-210 to which the data records are determined to correspond. For example, in one embodiment, inputting a truck cycle data record into the truck cycle learning model may produce a probability that the data record corresponds to each of the phases 204-210. The remote processing system 120 may then select the phase 204-210 with the highest probability as the output for that data record.

For example, inputting a particular data record into the truck cycle learning model may produce an 85% probability that the data record corresponds to the loading phase 204 and a 5% probability that the data record corresponds to each of the traveling full 206, dumping 208, or traveling empty 210 phases. In this case, the remote processing system 120 may select the loading phase 204 as the output for that data record because it has the highest probability.

The remote processing system 120 may be further configured to update the truck cycle data record with the outputted truck cycle phase 204-210. In the example above, the remote processing system 120 may add a value indicating the loading phase 204 to the data record. For example, the remote processing system 120 may add a column to the truck cycle data record reflecting the determined truck cycle phase 204-210 for that data record:

| | Truck Cycle Data Records | | | | |
|---|---|---|---|---|---|
| Time | Distance Between Truck and Loading Machine | Acceleration of Truck | Rotation of Truck | Magnetic Field Around Truck | Truck Cycle Phase |
| — | — | — | — | — | Loading |
| — | — | — | — | — | Loading |

The remote processing system 120 may be further configured to analyze the truck cycle data records to count the number of truck cycle phases 204-210 indicated in the updated truck cycle data records. In one embodiment, the remote processing system 120 may be configured to count the number of loading phases 204, traveling full phases 206, dumping phases 208, and/or traveling empty phases 210. In other embodiments, only certain phases 204-210 may be counted. For example, the operator of the worksite 100 may only be interested in the number of loads dumped by the truck 108 during the workday, so that revenue can be determined. Accordingly, in this example, the remote processing system 120 may be configured to count the number of dumping phases 208 reflected in the truck cycle data records for the relevant time period.

The remote processing system 120 may be further configured to output the counted number of phase(s) 204-214, and/or other metrics based thereon, via the I/O devices 312 for consideration by a user. Alternatively, or additionally, the remote processing system 120 may be configured to communicate this output to a computing system associated with the entity operating the worksite 100, where it may be viewed by worksite personnel. The remote processing system 120 may also be configured to send a report reflecting this output, for example, by e-mail to an e-mail address associated with the entity or another user of the remote processing system 120.

The remote processing system 120 may be configured to perform the same processes with respect to the loading machine cycle learning model as described above for the truck cycle learning model. In particular, the remote processing system may be configured to train a loading machine cycle learning model; to provide the loading machine cycle data records as input to the loading machine cycle learning model and output the loading machine cycle phases 212-218 to which they correspond; and to update the loading machine cycle data records to reflect the phase 212-218 to which they are determined to correspond. The remote processing system 120 may be further configured to count the number of each loading machine cycle phase 212-218, or of only certain phases 212-218, reflected in the updated loading machine cycle data records. The remote processing system 120 may also be configured to output the counted number of phase(s) 212-218-214, and/or other related metrics, or to send reports containing the same, as described above.

INDUSTRIAL APPLICABILITY

The disclosed embodiments may be applicable to any worksite for which it is desired to monitor work cycles of machines, such as trucks and loading machines. The disclosed embodiments may enable the worksite operator to automatically identify and count the work cycles and phases of trucks and/or loading machines using inexpensive hardware. For example, only an accelerometer and a GPS or other location device may be required instead of the more sophisticated and/or expensive sensors used in prior solutions, such as load sensors, bucket sensors, and/or control stick sensors. The worksite operator may thus avoid purchasing more expensive machines equipped with special hardware, or retrofitting older machines with the same, while still being able to monitor work cycles.

Figure 4:
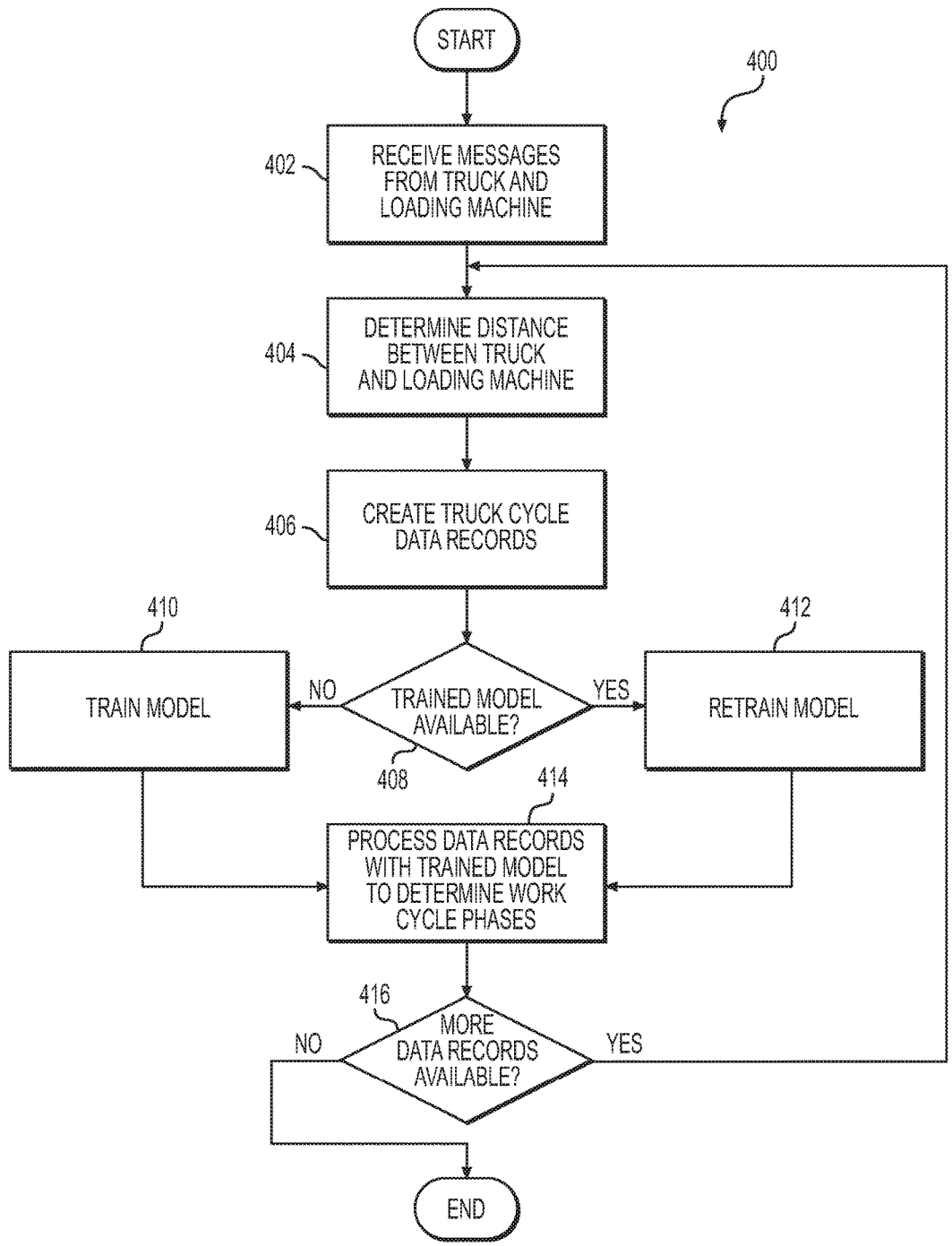
FIG. 4 is an exemplary method for monitoring the work cycle of the truck.

FIG. 4 is a flowchart illustrating an exemplary method 400 of monitoring the work cycle 200 of the truck 108. However, the same method 400 may be performed to monitor the work cycle 202 of the loading machine 102. The method 400 may be performed by the processing unit 300 (FIG. 3) of the remote processing system 120, executing instructions stored in memory 304-308.

The remote processing system 120 may receive messages from the truck 108 and the loading machine 102 (step 402). In particular, the remote processing system 120 may receive acceleration information messages, rotation information messages, magnetic field information messages, and location information messages from the truck 108 and the loading machine 102 as described above. The remote processing system 120 may determine distances between the truck 108 and the loading machine 102 using the received location information messages of the truck 108 and the loading machine 102, as discussed above (step 404).

The remote processing system 120 may create truck cycle data records (step 406). As discussed above, the truck cycle data records may contain values for the distance between the truck 108 and the loading machine 108 and for the acceleration of the truck 108 during particular sampling periods. The truck cycle data records may alternatively or additionally include values for the rotation of the truck 108 and/or the magnetic field around the truck 108 during the sampling periods.

The remote processing system 120 may determine whether a truck cycle learning model is available (step 408). If a truck work cycle learning model is not available, the remote processing system 120 may train a truck cycle learning model using the truck cycle data records created in step 406 (step 410), as discussed above. If a truck cycle learning model is available, the remote processing system may retrain the model using the truck cycle data records created in step 406 (step 412).

The remote processing system 120 may process the truck cycle data records with the trained truck cycle learning model to determine the phases 204-210 of the truck work cycle 200 to which they correspond, as discussed above (step 414). In step 414, the remote processing system 120 may also update the truck cycle data records to reflect the determined phase 204-210, as discussed above.

The remote processing system 120 may determine whether there are more truck cycle data records available for processing (step 416). If no additional records are available, the method 400 may end. If additional records are available, the method may return to step 406.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, not impossible. Numerous alternative embodiments could be implemented, using either current technology or technology developed after the filing date of this patent, which would still fall within the scope of the claims defining the invention.

What is claimed is:

1. A system for monitoring work cycles on a worksite including a truck and a loading machine, the system comprising:
   a communications interface;
   memory storing instructions;
   an accelerometer on the truck;
   a GPS device or other location device on each of the truck and the loading machine; and
   a processing unit configured to execute the instructions to:
      receive, via a data link connected to the communications interface, a signal from the GPS device or other location device on the truck and a signal from the accelerometer on the truck indicative of location information and acceleration information, respectively, for the truck and a signal from the GPS device or other location device on the loading machine indicative of location information for the loading machine;
      determine a distance between the truck and the loading machine based on a difference between the location information for the truck and the location information for the loading machine; and
      determine a phase of a work cycle of the truck based on the determined distance between the truck and the loading machine and on the acceleration information for the truck.

2. The system of claim 1, wherein the acceleration information includes at least a magnitude of acceleration of the truck in the vertical direction measured by the accelerometer on the truck.

3. The system of claim 1, further including at least one of a gyroscope or a magnetometer on the truck, wherein the processing unit is further configured to execute the instructions to:
   receive, via the datalink connected to the communications interface, a signal from at least one of the gyroscope or the magnetometer, respectively, indicative of at least one of rotation information or magnetic field information, respectively, for the truck; and
   determine the phase of the work cycle based further on the at least one of the rotation information or the magnetic field information.

4. The system of claim 3, wherein the rotation information includes a magnitude of rotation measured by the gyroscope on the truck, and the magnetic field information includes a magnitude of a magnetic field measured by the magnetometer on the truck.

5. The system of claim 1, wherein the work cycle includes at least one of a loading phase, a traveling full phase, a dumping phase, or a traveling empty phase.

6. The system of claim 1, wherein, to determine the phase of the work cycle, the processing unit is configured to execute the instructions to provide the determined distance between the truck and the loading machine and the acceleration information for the truck as input to a learning model.

7. The system of claim 6, wherein the model is a Hidden Markov Model.

8. The system of claim 6, wherein the processing unit is further configured to train the learning model using the determined distance between the truck and the loading machine and the acceleration information for the truck as input to a learning model.

9. A method for monitoring work cycles on a worksite including a truck and a loading machine, the truck including an accelerometer, and each of the truck and the loading machine including a GPS device or other location device, the method comprising:
   receiving, at a processing unit via a datalink connected to a communications interface a signal from the GPS device or other location device on the truck and a signal from the accelerometer on the truck indicative of location information and acceleration information, respectively, for the truck and a signal from the GPS device or other location device on the loading machine indicative of location information for the loading machine;
   determining, using the processing unit, a distance between the truck and the loading machine based on a difference between the location information for the truck and the location information for the loading machine; and
   determining, using the processing unit, a phase of a work cycle of the truck based on the determined distance between the truck and the loading machine and on the acceleration information for the truck.

10. The method of claim 9, wherein the acceleration information includes at least a magnitude of acceleration of the truck in the vertical direction measured by an accelerometer on the truck.

11. The method of claim 9, wherein the truck further includes at least one of a gyroscope or a magnetometer, the method further comprising:
   receiving via the datalink connected to the communications interface a signal from at least one of the gyroscope or the magnetometer, respectively, indicative of at least one of rotation information or magnetic field information, respectively, associated with the truck; and
   determining the phase of the work cycle based further on the at least one of the rotation information or the magnetic field information.

12. The method of claim 11, wherein the rotation information includes a magnitude of rotation measured by the gyroscope on the truck, and the magnetic field information includes a magnitude of a magnetic field measured by the magnetometer on the truck.

13. The method of claim 9, wherein the work cycle includes at least one of a loading phase, a traveling full phase, a dumping phase, or a traveling empty phase.

14. The method of claim 9, wherein determining the phase of the work cycle includes providing the determined distance between the truck and the loading machine and the acceleration information for the truck as input to a learning model.

15. The method of claim 14, wherein the model is a Hidden Markov Model.

16. The method of claim 14, further comprising training the learning model using the determined distance between the truck and the loading machine and the acceleration information for the truck as input to the learning model.

17. A system for monitoring work cycles on a worksite including a truck and a loading machine, the system comprising:
- a communications interface;
- memory storing instructions;
- an accelerometer on the truck;
- a GPS device or other location device on each of the truck and the loading machine; and
- a processing unit configured to execute the instructions to:
  - receive, via a data link connected to the communications interface, a signal from the GPS device or other location device on the truck and a signal from the accelerometer on the loading machine indicative of location information and acceleration information, respectively, for the loading machine and a signal from the GPS device or other location device on the truck indicative of location information for the truck;
  - determine a distance between the loading machine and the truck based on a difference between the location information for the loading machine and the location information for the truck; and
  - determine a phase of a work cycle of the loading machine based on the determined distance between the loading machine and the truck and on the acceleration information for the loading machine.

18. The system of claim 17, wherein the acceleration information includes at least a magnitude of acceleration of the loading machine in the vertical direction measured by an accelerometer on the loading machine.

19. The system of claim 17, wherein the work cycle includes at least one of a digging phase, a swinging full phase, a dumping phase, or a swinging empty phase.

20. The system of claim 17, wherein, to determine the phase of the work cycle, the processing unit is configured to execute the instructions to provide the determined distance between the loading machine and the truck and the acceleration information for the loading machine as input to a learning model.

* * * * *